US012593848B2

(12) United States Patent (10) Patent No.: US 12,593,848 B2

Seo (45) Date of Patent: Apr. 7, 2026

---

(54) TRANSPARENT ANTIVIRAL/ANTIMICROBIAL COATING

(71) Applicant: University of Kentucky Research Foundation, Lexington, KY (US)

(72) Inventor: Ambrose Sungseok Seo, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 714 days.

(21) Appl. No.: 17/958,954

(22) Filed: Oct. 3, 2022

(65) Prior Publication Data

US 2023/0112638 A1 Apr. 13, 2023

Related U.S. Application Data

(60) Provisional application No. 63/251,109, filed on Oct. 1, 2021.

(51) Int. Cl.
| | |
|---|---|
| *A01N 59/20* | (2006.01) |
| *A01N 25/34* | (2006.01) |
| *C03C 3/12* | (2006.01) |

(52) U.S. Cl.
CPC ............. *A01N 59/20* (2013.01); *A01N 25/34* (2013.01); *C03C 3/12* (2013.01); *C03C 2204/02* (2013.01)

(58) Field of Classification Search
CPC ........... A01N 59/20; A01N 25/34; C03C 3/12

USPC .......................................................... 524/122
See application file for complete search history.

(56) References Cited

U.S. PATENT DOCUMENTS

| | | | | |
|---|---|---|---|---|
| 2012/0319963 A1* | 12/2012 | Lee | ....................... | G06F 3/0446 |
| | | | | 345/173 |
| 2015/0208664 A1* | 7/2015 | Borrelli | ................. | C03C 17/006 |
| | | | | 424/635 |

FOREIGN PATENT DOCUMENTS

| | | | | |
|---|---|---|---|---|
| CN | 109722087 A | 5/2019 | | |
| JP | 2020139165 A | 9/2020 | | |
| WO | 2013038705 A1 | 3/2013 | | |
| WO | WO-2020145954 A1 * | 7/2020 | ............. | C23C 28/00 |

OTHER PUBLICATIONS

Zhong et al., Nanometer-thick copper films grown by thermal atomic layer deposition. Published 2015. Thin Solid Films. pp. 673-680 (Year: 2015).*

* cited by examiner

*Primary Examiner* — Deve V Hall

(74) *Attorney, Agent, or Firm* — Dinsmore & Shohl LLP

(57) ABSTRACT

The present disclosure concerns copper coatings on glass with a thickness of about 8 to 10 nm to maintain high levels of transparency. In some aspects, the coatings are of copper, copper (I) oxide, and/or copper (II) oxide. In some aspects, the copper coatings as set forth herein provide an antiviral and/or antimicrobial surface for safer touch-screen devices.

16 Claims, 2 Drawing Sheets

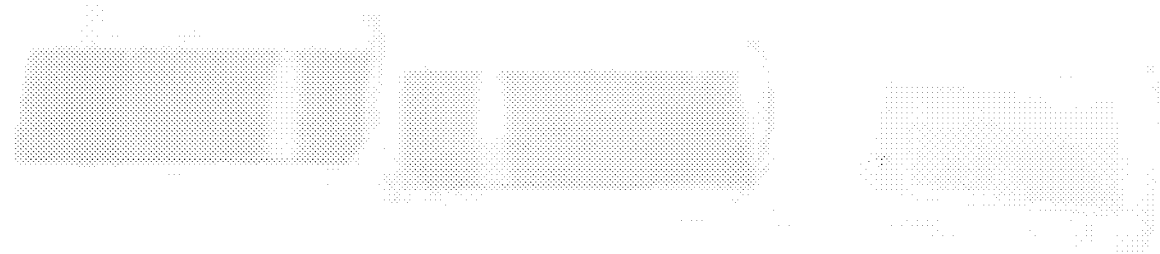
FIG. 2
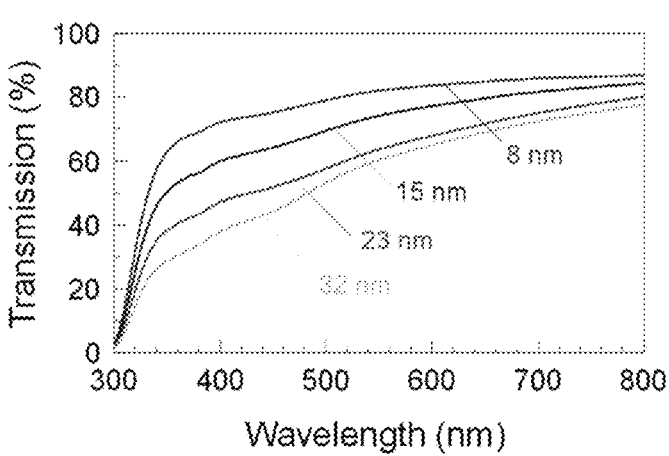
FIG. 3
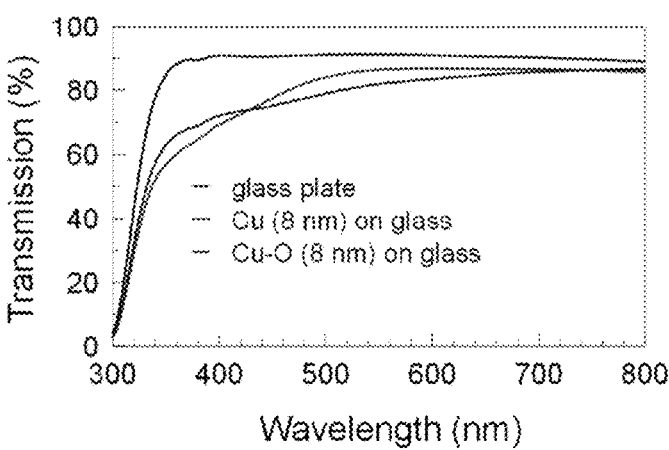

Photon Energy (eV)

$2\theta$ (deg.)

TRANSPARENT ANTIVIRAL/ANTIMICROBIAL COATING

CROSS-RELATED APPLICATIONS

This application claims priority to U.S. Provisional Application 63/251,109, filed Oct. 1, 2021, the content of which is hereby incorporated by reference in its entirety.

TECHNICAL FIELD

The present disclosure concerns copper and/or copper oxide coatings for glass surfaces with high transparency.

BACKGROUND

The advent of touch screens and nano-sized circuitry has led to a boom in portable electronic devices. Using just a finger-tip, a user can perform any number of operations, such as scroll, type, take photographs, edit, film, or remotely operate a machine. While the underlying circuitry is what responds to the touch, the portable devices require a glass or transparent screen to allow the user to interact with the display.

Concurrently, the global pandemic caused by the SARS-CoV-2 coronavirus has triggered an enormous concern over hygiene, with individuals looking to minimize risk of contact with infectious viral particles or other microbes. With personal electronic device use prevalent in public spaces, there is therefore a need for an approach to readily and constantly disinfect and/or clean the touch screens to reduce risk of transmitting an infectious microbe.

BRIEF DESCRIPTION OF THE DRAWINGS

The following detailed description of specific aspects of the present disclosure can be best understood when read in conjunction with the following drawings, in which like structure is indicated with like reference numerals and in which:

FIG. 1 shows the transparency changes in deposition of copper on a glass surface at 30, 60 and 80 seconds.

FIG. 2 shows the optical transmission spectra of copper oxide coatings with the indicated thicknesses of 8 nm, 15 nm, 23, nm, and 32 nm on glass plates.

FIG. 3 shows a comparison of optical transmission of 8 nm thick copper and 8 nm thick copper oxide coatings on glass plates.

Figure 4:
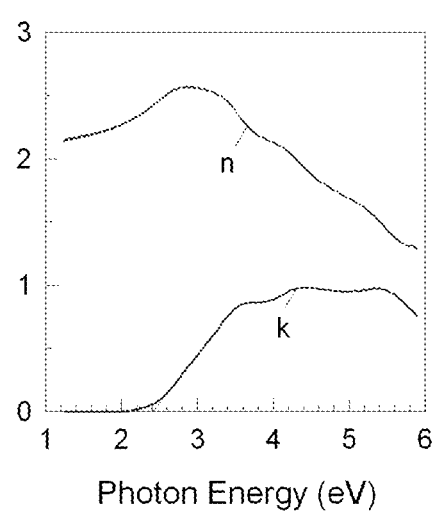
FIG. 4 shows the refractive index (n) and the extinction coefficient (k) for an 8 nm thick copper oxide coating.

Reference will now be made in greater detail to various aspects of the present disclosure, some aspects of which are illustrated in the accompanying drawings.

DETAILED DESCRIPTION

The present disclosure is directed copper coatings on a substrate surface. The presence of copper on the surface can provide a disinfecting or sanitizing effect, as copper, copper oxides, and alloys thereof provide anti-microbial properties to the substrate once coated thereon. In some aspects, the copper coating is of elemental copper. In other aspects, the copper coating is an alloy or multiple alloys of elemental copper. In some aspects, the copper coating is of copper oxide, including copper (I) oxide (or cuprous oxide or $Cu_2O$)

and/or copper (II) oxide (or cupric oxide or CuO). As referred to herein, a "copper coating" refers to a coating that includes elemental copper and/or copper (I) oxide and/or copper (II) oxide.

In some aspects, providing a copper or copper alloy coating to the surface of a substrate provides an anti-microbial and/or anti-viral coating, wherein the presence of copper protects and/or prevents the growth and/or survival of viruses, bacteria and/or other microbes that may come into contact with the substrate. The anti-microbial properties and/or anti-viral properties provided by copper are generally understood, with many mechanisms of action wherein copper can disrupt the integrity and/or functioning of a virus, bacteria, and/or other microbes. Examples of ways in which copper or alloys thereof can act include generating radicals, protein structure disruption, enzyme disruption, interference with essential ions and/or other elements, respiration disruption, metabolism disruption, lipid peroxidation, oxidation, membrane disruption, and other broad spectrum effects.

In some aspects, the copper coating is about 10 nm in thickness on the substrate surface or less, such as about 9, 8, 7, 6, 5, 4, 3, 2, or 1 nm. As identified herein, direct sputtering and/or pulsed vapor deposition from a copper metal or copper ceramic target can generate a copper-based coating on the surface of the substrate. By controlling the operating conditions, such as time and/or temperature and/or oxygen partial pressure, the desired coating of copper can be achieved. In some aspects, the coating on the surface of the substrate is of 8 nm or less of copper (I) oxide. In some aspects, the coating on the surface of the substrate is of 8 nm or less of copper (II) oxide. In some aspects, the coating on the surface of the substrate is of 8 nm or less of copper (I) oxide and copper (II) oxide. In further aspects, the coating on the surface of the substrate is of 8 nm or less of copper metal and/or copper (I) oxide and/or copper (II) oxide.

In some aspects, the present disclosure concerns a copper and/or copper oxide coating on the surface of a substrate. In some aspects, the substrate is glass. In some aspects, the substrate is a transparent solid. In some aspects, the substrate is a transparent solid of one or more of silicon dioxide, sodium carbonate, calcium carbonate, silica, lime, potash, magnesium oxide, aluminum oxide, iron oxide, boric oxide, lead monoxide, or combinations thereof. In some aspects, the substrate is a glass with a ceramic shield thereon. In further aspects, the substrate is part of or configured for incorporation into a touch screen device.

In some aspects, the copper coatings as set forth herein have high optical transparency. In some aspects, high optical transparency can be considered to permit transmission of about 80% or higher of light in the visible spectrum attempting to pass through, including about 81, 82, 83, 84, 85, 86, 87, 88, 89, 90, 91, 92, 93, 94, 95, 96, 97, 98, 99, and 100%. In some aspects, the optical transparency of the coating permits about 80% or higher transmission of light of light of a wavelength of about 350 nm to about 800 nm, including about 375, 400, 425, 450, 525, 550, 575, 600, 625, 650, 675, 700, 725, 750, and 775 nm. In some aspects, the coating can further permit transmission of wavelengths higher than the visible spectrum, extending into infrared light and above.

In some aspects of the present disclosure, the coating on the surface of the substrate permits viewing through the substrate. In aspects where the substrate is transparent, the coating provides no to minimal occlusion or of 20% or less occlusion, including 19, 18, 17, 17, 15, 14, 13, 12, 11, 10, 9, 8, 7, 6, 5, 4, 3, 2, 1, and 0% occlusion. It will therefore be appreciated that the coatings can be applied to a viewing substrate, such as a glass pane, to allow a user to view through. In some aspects, the substrate may be coated on more than one surface.

In other aspects, the present disclosure concerns a touch screen for an electronic device. As identified herein, the copper coating when applied at a thickness of about 8 nm or less provides an anti-microbial and/or anti-viral coating thereon while still allowing a user to view the underlying display. In further aspects, the copper coatings of the present disclosure are of nominal thickness such that the coating is transparent or of sufficient transparency that visible light can pass through unimpeded or with an impedance of 20% or less.

Methods of Preparation

The present disclosure further concerns methods to deposit the copper coatings as set forth herein. In some aspects, the methods concern deposition of elemental copper. In further aspects, deposition of elemental copper can then be oxidized through exposure to the air to copper (I) oxide and/or copper (II) oxide. In other aspects, the methods concern deposition of copper (I) oxide and/or copper (II) oxide.

The present disclosure concerns methods for the deposition of a copper coating on a surface of a substrate. In some aspects, the substrate is a silica based glass. In some aspects, the copper coating is applied through vaporized deposition of elemental copper, copper (I) oxide and/or copper (II) oxide on the surface of the substrate. In some aspects, as the copper coatings need to be of a thickness of about 10 nm or less, physical vapor deposition methods are used to deposit the copper coating on the substrate. In other aspects, the copper coating can be applied through chemical vapor deposition.

In some aspects, the methods of the present disclosure concern deposition of the copper coating by physical vapor deposition. The methods include application of an energy source to a material to be deposited and the exposed substrate placed to receive evaporate and/or sputtered atoms from the material in a pressure controlled environment. In some aspects, the pressure controlled environment includes the presence of oxygen to allow for the formation of copper (I) oxide and/or copper (II) oxide. In some aspects, the pressure controlled environment may include an inert or noble gas, such as argon, helium, neon, krypton and/or xenon. In some aspects, following deposition of the copper coating, the copper coating is exposed to an oxygen source, such as air. In certain aspects, oxygen may react with the copper coating to provide the formation of copper (I) oxide and/or copper (II) oxide.

In some aspects, the methods of the present disclosure include application of energy to a material to provide the copper coating. In some aspects, the materials include copper and/or copper oxide (I) and/or copper (II) oxide. In some aspects, the material is elemental copper or copper metal. In other aspects, the material is a copper ceramic that includes copper (I) oxide and/or copper (II) oxide.

In some aspects, the methods include application of an energy to the material to induce sputtering and/or evaporation. In some aspects, the energy is provided by application of a direct current. It will be appreciated that the direct current can vary as needed, as long as the plasma is able to be successfully generated. In some aspects, the direct current is of about 30 to 200 W, including about 40, 50, 60, 70, 80, 90, 100, 110, 120, 130, 140, 150, 160, 170, 180, and 190 W. In some aspects, the direct current is applied to the material of copper metal. In some aspects, the direct current is applied under vacuum or partial vacuum. In some aspects, the pressure of the reaction chamber for the sputter is of about 0.01 to about 0.5 mTorr. In some aspects, a noble gas is present at pressure of about 0.01 mTorr to about 0.5 mTorr. In some aspects, argon is present. In some aspects, the pressure is of about 0.3 mTorr. In some aspects, the substrate is at a temperature from about 200 to 400° F. to allow copper from the material to anneal. In some aspects, annealing may allow for oxidation of deposited copper to provide copper (I) oxide and/or copper (II) oxide molecules within the copper coating on the surface of the substrate. In some aspects, maintaining a short period of time for copper deposition on the surface of the substrate allows for controlling the thickness of the copper coating to maintain transparency. In some aspects, a direct current sputtering time of 60 seconds or less may provide for a copper coating with 80% or higher optical transparency, including 50 seconds or less, 40 seconds or less, 30 seconds or less. 20 seconds or less, 10 seconds or less, 5 seconds or less, or of about 1 second.

In some aspects, the methods of the present disclosure include physical vapor deposition of the copper coating by pulsed laser physical vapor deposition. In some aspects, the methods include pulsing a laser at a copper containing material to generate a copper-containing vapor. In some aspects, the pulsed laser is applied for several minutes to achieve the desired thickness of about 10 nm or less. In some aspects, the material is a copper oxide ceramic or a copper metal. In other aspects, the pulsed laser is an ultraviolet laser. In some aspects, the pulsed laser is of about 150 to 300 nm in length, including about 160, 170, 180, 190, 200, 210, 220, 230, 240, 250, 260, 270, 280, and 290. In certain aspects, the pulsed laser wavelength is about 248 nm. In some aspects, the laser is repeatedly pulsed for a duration of between 5 and 50 nanoseconds (ns), including about 10, 15, 20, 25, 30, 35, 40, and 45 ns. In some aspects, the laser is pulsed repeatedly at a duration of 20 ns. In some aspects, the laser is pulsed at a frequency of about 1 to 50 Hz, including about 5, 10, 15, 20, 25, 30, 35, 40, and 45 Hz. In some aspects, the laser is pulsed at a frequency of about 10 Hz. In some aspects, the space between pulses is of about 0.01 to about 1 second, including about 0.02, 0.03, 0.04, 0.05, 0.06, 0.07, 0.08, 0.09, 0.1, 0.2, 0.3, 0.4, 0.5, 0.6, 0.7, 0.8, and 0.9 seconds. In some aspects, the substrate receiving the copper containing vapor is at a temperature of about 500° F. to room temperature. In some aspects, the pulsed laser is applied under a vacuum. In other aspects, the pulsed laser deposition is performed at a partial pressure of about 0.3 mTorr of oxygen or less, including 0.2, 0.1, 0.01, 0.001 mTorr. As identified in the examples set forth herein, keeping the partial pressure of oxygen below 0.3 mTorr can provide for increased deposition of copper (I) oxide on the surface of the substrate (see, e.g., FIG. 5).

EXAMPLES

The following examples illustrate one or more features of the present disclosure. It should be understood that these examples are not intended to limit the scope of the disclosure or the appended claims in any manner.

Direct Current Sputtering

A few nanometer-thick Cu thin film coatings were deposited on glass substrates using a Cu metal target in a vacuum chamber at room temperature. The deposition time was controlled from about 9 minutes to about 30 seconds. As the deposition time decreased, the thickness of the copper film coating became less opaque, but not so transparent. It was noted that there is a noticeable color change between about 80 and about 60 seconds of the deposition time, as shown in FIG. 1. Cu film coatings deposited for 30 seconds showed improved transparency.

Thermal annealing on the samples was conducted at the temperature of about 200° C. (i.e., open-air annealing) for about 30 minutes. This annealing process oxidized the Cu thin films, resulted in optically transparent copper oxide (Cu—O) film coatings. The optical transparency increased to ~80% or higher as the thickness of the coating decreased from 32 nm to 8 nm, as shown in FIG. 2. FIG. 3 shows the optical transmission spectra of both copper metal and copper oxide (Cu—O) film coatings (8-nm-thick), which are highly transparent. For comparison, a glass plate's optical transparency is about 90% in a typical human eye's visible range between 380 nm and 750 nm wavelengths.

Using optical spectroscopic ellipsometry, the precise thicknesses of the coatings were estimated. As the deposition time increased from 30 seconds to 80 seconds, the thickness increased from 8 nm to 23 nm, implying the deposition rate of approximately 0.3 nm per second. The extinction coefficient data from the ellipsometry measurement (FIG. 4) shows that the optical bandgap energy of the coating is 2.0-2.4 eV, indicating mostly the $Cu_2O$ phase.

Pulsed Laser Deposition

This pulsed laser deposition technique uses a CuO ceramic target, which is different from a Cu metal target that is used in the DC sputtering method described in the method above.

Ultraviolet laser (wavelength 248 nm) pulses were used for vaporizing a CuO ceramic target in a vacuum chamber. The Cu—O vapor is then deposited on glass substrates at temperatures of 500° C. and lower. The thickness of the copper oxide coating is controlled by the evaporation time.

Figure 5:
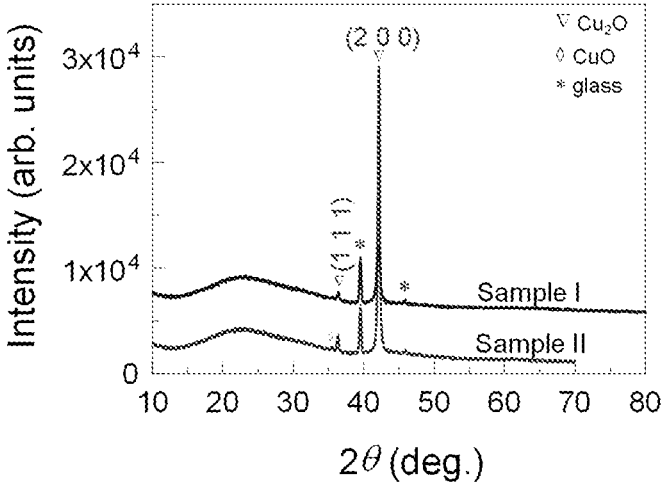
FIG. 5 shows X-ray diffraction of copper oxide coatings by pulsed laser deposition for both CuO and $Cu_2O$.

The oxygen partial pressure during the evaporation inside the vacuum chamber affects the composition of the copper oxide coating. As the oxygen partial pressure decreased, the coating included the $Cu_2O$ phases mostly, according to X-ray diffraction data, as shown in FIG. 5.

When the oxygen partial pressure was higher than approximately 0.3 mTorr of $O_2$ or the temperature of glass substrates was higher than 500° C., the coating contained an increased amount of the CuO phase. Note that the $Cu_2O$ phase is known to show more effective antiviral properties than the CuO phase. Hence, it is important to keep low oxygen partial pressures (preferably vacuum conditions) during the evaporation process.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including." such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A copper coating on a substrate, wherein the copper coating is a film of about 8 to 10 nm in thickness,
wherein the substrate is glass;
wherein the copper coating comprises one or both of copper (I) oxide and copper (II) oxide; and
wherein the copper coating on the substrate permits transmittance of 80% or higher of light of a wavelength of about 350 nm to about 800 nm.

2. The copper coating of claim 1, wherein the copper coating is of about 8 nm in thickness.

3. The copper coating of claim 1, wherein the copper coating is of about 9 nm in thickness.

4. The copper coating of claim 1, wherein the copper coating is of about 10 nm in thickness.

5. The copper coating of claim 1, wherein the copper coating comprises copper (I) oxide.

6. The copper coating of claim 1, wherein the copper coating comprises copper (II) oxide.

7. The copper coating of claim 1, wherein the copper coating comprises copper (I) oxide and copper (II) oxide.

8. The copper coating of claim 1, wherein the coating is deposited on the substrate by direct current sputtering.

9. The copper coating of claim 1, wherein the coating is deposited on the substrate by pulsed vapor deposition.

10. A touch screen device comprising the copper coating of claim 1.

11. A method of preparing the copper coating of claim 1, comprising performing direct current sputtering with a copper-based target and a substrate to form a coating of copper on the substrate.

12. The method of claim 11, wherein the copper-based target is selected from copper metal or a copper oxide ceramic.

13. A method of preparing the copper coating of claim 1, comprising performing pulsed vapor deposition with a copper-based target and a substrate to form a coating of copper on the substrate.

14. The method of claim 13, wherein the copper-based target is selected from copper metal or a copper oxide ceramic.

15. The method of claim 13, wherein the pulsed vapor deposition is performed at about 0.3 m Torr of oxygen or less.

16. The method of claim 13, wherein the pulsed vapor deposition is performed at about 500° C. or less.

* * * * *